United States Patent
Takahashi et al.

(10) Patent No.: US 7,453,434 B2
(45) Date of Patent: Nov. 18, 2008

(54) LIQUID CRYSTAL DISPLAY DEVICE

(75) Inventors: Hiroyuki Takahashi, Funabashi (JP);
Shinya Hashimoto, Mobara (JP);
Takahiro Yamada, Mobara (JP)

(73) Assignees: Hitachi Displays, Ltd., Chiba-Ken (JP);
Hitachi Device Engineering Co., Ltd.,
Chiba-Ken (JP)

( * ) Notice: Subject to any disclaimer, the term of this patent is extended or adjusted under 35 U.S.C. 154(b) by 0 days.

(21) Appl. No.: 10/411,267

(22) Filed: Apr. 11, 2003

(65) Prior Publication Data

US 2003/0201958 A1 Oct. 30, 2003

(30) Foreign Application Priority Data

Apr. 26, 2002 (JP) ............... 2002-126432

(51) Int. Cl.
*G09G 3/36* (2006.01)

(52) U.S. Cl. .............. 345/102; 345/204; 345/205; 345/690; 345/1.1; 345/3.1

(58) Field of Classification Search ............. 345/102, 345/204–207, 208–215, 690–699, 1.1, 3.1–3.4, 345/1.3

See application file for complete search history.

(56) References Cited

U.S. PATENT DOCUMENTS

| | | | | |
|---|---|---|---|---|
| 6,144,359 A * | 11/2000 | Grave | .......................... | 345/102 |
| 6,195,140 B1 | 2/2001 | Kubo et al. | ................... | 349/44 |
| 6,297,868 B1 * | 10/2001 | Takenaka et al. | ............. | 349/151 |
| 6,529,257 B1 | 3/2003 | Nakano | | |
| 6,621,541 B1 * | 9/2003 | Choi | .......................... | 349/113 |
| 6,643,224 B1 * | 11/2003 | Sekiguchi et al. | ........... | 368/242 |
| 6,714,270 B2 * | 3/2004 | Seiki et al. | ................... | 349/114 |
| 6,738,115 B1 * | 5/2004 | Iijima | ......................... | 349/113 |
| 2002/0051107 A1 * | 5/2002 | Nagayama et al. | .......... | 349/113 |
| 2002/0126077 A1 | 9/2002 | Baek | | |
| 2003/0038908 A1 * | 2/2003 | Ikeno et al. | ................. | 349/113 |
| 2004/0104883 A1 * | 6/2004 | Drader | ....................... | 345/102 |
| 2007/0019138 A1 * | 1/2007 | Kubo et al. | ................. | 349/114 |

FOREIGN PATENT DOCUMENTS

| | | | |
|---|---|---|---|
| CN | 1293380 | | 5/2001 |
| JP | 09-138421 | * | 5/1997 |
| JP | 9-269498 | | 10/1997 |
| JP | 2000-019563 | | 1/2000 |
| JP | 2000-193936 | | 7/2000 |
| JP | 2002-40392 | | 2/2002 |

* cited by examiner

*Primary Examiner*—Richard Hjerpe
*Assistant Examiner*—Leonid Shapiro
(74) *Attorney, Agent, or Firm*—Antonelli, Terry, Stout & Kraus, LLP.

(57) ABSTRACT

A liquid crystal display device with both functions of transmission-mode display and reflection-mode display is capable of providing an improved display quality in each display mode, to thereby obtain on-screen display images of high quality in either one of the display modes. The liquid crystal display device includes a scan signal line drive circuit operable to apply a scan signal to a number of scan signal lines, an image/video signal line drive circuit which applies an image signal to a number of image signal lines, and a power supply circuit for supplying necessary voltages to the scan signal line drive circuit and image signal line drive circuit. The power supply circuit includes a counter electrode voltage generation circuit for selecting a voltage optimized for a respective display mode of the transmission mode and the reflection mode to thereby apply the selected voltage to a counter electrode.

21 Claims, 8 Drawing Sheets

LIQUID CRYSTAL DISPLAY DEVICE

BACKGROUND OF THE INVENTION

The present invention relates in general to liquid crystal display devices; and, more particularly, the invention relates to a liquid crystal display device of the type having a transmissive display region or area and a reflective display area in every picture element, and also having two-mode display functions, including a transmission mode and a reflection mode.

Liquid crystal display devices offer several features, such as slim size and light weight, plus low power consumption, and thus they are widely employed as image/text data display devices in a variety of types of information equipment typically including personal computers (PCs), and they are also used in portable or mobile information terminals, digital cameras and camera-embedded video tape recorders (VTRs). In recent years, the demand for low power consumption is becoming stronger in accordance with rapid popularization of small-size digital equipment, such as, in particular, handheld wireless telephone handsets, known as cellular phones, and mobile information terminals and the like.

Most liquid crystal display devices for use in personal computers and liquid crystal display monitors are generally of the type employing a transmission-type display mode (simply referred to as a transmission mode hereinafter) which visualizes images by controlling the transmission amount of light emitted from an illumination device—this is typically installed on the back face of a liquid crystal display panel and is called a back-light-on the liquid crystal display panel side. However, the electrical power being consumed by the backlight amounts for more than 50 percent (%) of the power that is consumed by the entire liquid crystal display device. Due to this, in battery-driven small-size equipment, such as cellular handy phones and mobile information terminals and the like, the length of the operating time thereof is significantly limited.

In view of this, these small-size electronic devices are often designed to employ liquid crystal display devices of the type using a reflection-type display mode (simply referred to hereafter as a reflection mode) which visualizes images by permitting reflection of ambient light without the use of any backlight. Such reflection of ambient light is achievable by providing a reflective plate on the outer surface or inner surface of a liquid crystal display panel, or alternatively by adding reflecting functions to the pixel-forming electrodes.

The reflection mode liquid crystal display devices are faced with a problem that the visual recognizability or viewability of an on-screen display decreases when the ambient light is less in intensity (i.e. in the dark). For equipment such as cellular phones that are being used everywhere without regard to indoor and outdoor environments, it is necessary to offer required usability irrespective of whether the ambient light is bright or dark. As a remedy for this, a liquid crystal display device of the partial-transmission/partial-reflection type has been proposed, which device has both transmission-mode display functionality, and reflection-mode display functionality with a transmission mode display area and a reflection mode display area being formed in the region of a single picture element or "pixel" (see JP-A-2000-19563).

Unfortunately, in the transmission mode display and the reflection mode display, there are different optimal values for the voltages which are applied between a pixel electrode and an opposite or "counter" electrode in order to create an appropriate electric field in a liquid crystal layer. The optimal voltage as stated herein refers to a voltage which is provided at the time of obtaining flicker-free on-screen images. In most cases, an optimal voltage in the transmission mode is lower in potential than that in the reflection mode.

In the prior known partial-transmissive/reflective liquid crystal display device referred to above, the voltage being applied to the counter electrode in order to form an electric field between it and the counter electrode is simply set to the same level in any display mode, i.e. of either the transmission mode or the reflection mode. Accordingly, even when onscreen images are of good quality in the transmission mode, flicker can occur on the display screen when the display mode is switched to the reflection mode, resulting in a decrease in display image quality.

It is therefore an object of the present invention to provide a liquid crystal display device of the partial-transmission/reflection type having displaying functions in both a transmission mode and a reflection mode, which device is capable of improving the image quality in each display mode to thereby obtain high-quality on-screen display images in either display mode.

SUMMARY OF THE INVENTION

To attain the foregoing object, this invention provides a liquid crystal display device having a principal arrangement which provides counter voltages that are optimized for respective ones of the transmission mode and the reflection mode and applies a selected one of them to a counter electrode in accordance with selection of these display modes. Representative arrangements of this invention will be described below.

(1) A liquid crystal display device includes a liquid crystal display panel having a number of pixel electrodes with two display mode functions, including a transmission mode and a reflection mode, a counter electrode for applying an electric field between itself and the pixel electrodes, and a liquid crystal layer interposed between the pixel electrodes and the counter electrode, and a counter voltage generation circuit for applying to the counter electrode an optimal voltage with respect to a respective display mode of the transmission mode and the reflection mode.

(2) In (1), the liquid crystal display device further includes an illumination device disposed at the back face of the liquid crystal display device, wherein the counter voltage generation circuit applies to the counter electrode a voltage different during turn-on of the illumination device than it is during turn-off thereof.

(3) A liquid crystal display device includes a liquid crystal display panel having a number of pixel electrodes with two display mode functions, including a transmission mode and a reflection mode, a counter electrode for applying an electric field between itself and the pixel electrodes, and a liquid crystal layer to which the electric field is applied, and a counter voltage generation circuit for applying to the counter electrode a different voltage with respect to a respective display mode of the transmission mode and the reflection mode.

(4) In (3), the liquid crystal display device further includes an illumination device disposed at a back face of the liquid crystal display panel, wherein the counter voltage generation circuit applies to the counter electrode a voltage for use in the transmission mode when the illumination device turns on and applies a voltage for use in the reflection mode when the illumination device turns off.

(5) A liquid crystal display device includes a liquid crystal display panel having a liquid crystal layer interposed between a main surface of a first substrate and a main surface of a second substrate, a number of scan signal lines extending in a first direction of the main surface of the first substrate and being provided in parallel with a second direction, a number of image signal lines extending in the second direction and being provided in parallel to the first direction while being disposed to cross the scan signal lines, an active element disposed at each crossing portion of the scan signal lines and the image signal lines for control of turn-on and turn-off of a pixel, a pixel electrode driven by the active element and having two display mode functions of a transmission mode and a reflection mode, and a counter electrode formed above the main surface of the first substrate or the second substrate for generating an electric field between itself and the pixel electrode, a scan signal line drive circuit for applying a scan signal to the scan signal lines, an image signal line drive circuit for applying an image signal to the image signal lines, and a power supply circuit for supplying necessary voltages to the scan signal line drive circuit and the image signal line drive circuit along with the counter electrode, wherein the power supply circuit has a counter voltage generation circuit for applying a first counter voltage to the counter electrode in the transmission mode and for applying thereto a second counter voltage different from the first counter voltage in the reflection mode.

(6) In (5), the liquid crystal display device further includes an illumination device disposed at a back face of the liquid crystal display panel, wherein the counter voltage generation circuit applies to the counter electrode the first counter voltage when the illumination device turns on and applies thereto the second counter voltage when the illumination device turns off.

(7) In (5), the liquid crystal display device further includes an illumination device disposed on the back face of the liquid crystal display panel, and a counter voltage selector circuit provided in the image signal line drive circuit for applying a counter voltage select signal to the counter voltage generation circuit while distinguishing between the turn-on and turn-off of the illumination device, wherein the counter voltage generation circuit is operatively responsive to receipt of the counter voltage select signal for applying the first counter voltage to the counter electrode when the illumination device turns on and for applying thereto the second counter voltage when the illumination device turns off.

(8) In (7), the liquid crystal display device further includes a group of terminals provided at a peripheral part of the liquid crystal display panel for inputting a display-use signal and a voltage from an external signal source to the scan signal line drive circuit and the image signal line drive circuit, and a flexible printed circuit board having one end connected to the terminal group and the other end connected to the external signal source, wherein the power supply circuit is mounted on the flexible printed circuit board.

(9) A liquid crystal display device includes: a first liquid crystal display panel which is used for displaying an image in a transmission mode, which panel has a number of first pixel electrodes, a first counter electrode for applying an electric field between itself and the first pixel electrodes, and a first liquid crystal layer interposed between the first pixel electrodes and the first counter electrode; a second liquid crystal display panel which is used for displaying an image in a reflection mode, which panel has a number of second pixel electrodes, a second counter electrode for applying an electric field between itself and the second pixel electrodes, and a second liquid crystal layer interposed between the second pixel electrodes and the second counter electrode; a first counter voltage generation circuit for applying a first counter voltage optimized for display of the transmission mode to the first counter electrode of the first liquid crystal display panel; and a second counter voltage generation circuit for applying a second counter voltage optimized for display of the reflection mode to the second counter electrode of the second liquid crystal display panel.

(10) A liquid crystal display device includes:

a first liquid crystal display panel having a first liquid crystal layer interposed between a main surface of a first substrate and a main surface of a second substrate, a number of first scan signal lines extending in a first direction of the main surface of the first substrate and being provided in parallel with a second direction thereof, a number of first image signal lines extending in the second direction and being provided in parallel to the first direction while being disposed to intersect the first scan signal lines, a first active element disposed at each crossing portion of the first scan signal lines and the first image signal lines for controlling turn-on and turn-off of a pixel, a first pixel electrode driven by the first active element for performing displaying in a transmission mode, and a first counter electrode formed at the main surface of either the first substrate or the second substrate for generating an electric field between itself and the first pixel electrode;

a second liquid crystal display panel having a second liquid crystal layer interposed between a main surface of a third substrate and a main surface of a fourth substrate, a number of second scan signal lines extending in the first direction of the main surface of the third substrate and being provided in parallel with the second direction thereof, a number of second image signal lines extending in the second direction and being provided in parallel to the first direction while being disposed to intersect the second scan signal lines, a second active element disposed at each crossing portion of the second scan signal lines and the second image signal lines for controlling turn-on and turn-off of a pixel, a second pixel electrode driven by the second active element for performing displaying in a reflection mode, and a second counter electrode formed at the main surface of either the third substrate or the fourth substrate for generating an electric field between itself and the second pixel electrode;

a scan signal line drive circuit for applying scan signals to the first scan signal lines provided at the first liquid crystal display panel and the second scan signal lines provided at the second liquid crystal display panel;

an image signal drive circuit for applying first image signals to the first image signal lines provided at the first liquid crystal display panel and for applying second image signals to the second image signal lines provided at the second liquid crystal display panel; and a power supply circuit for supplying necessary voltages to the scan signal line drive circuit and the image signal line drive circuit and for supplying a first counter voltage optimized for the transmission mode to the first counter electrode of the first liquid crystal display panel and also a second counter voltage optimized for the reflection mode to the second counter electrode of the second liquid crystal display panel.

(11) In (10), the power supply circuit includes a counter voltage generation circuit for generation of the first counter voltage and the second counter voltage which are made optimal to respective display modes of the transmission mode and the reflection mode.

(12) In (11), the liquid crystal display device further includes an illumination device disposed on a back face of the first liquid crystal display panel, and a counter voltage selector circuit provided in the image signal line drive circuit for distinguishing between turn-on and turn-off of the illumination device and for applying a counter voltage select signal to the counter voltage generation circuit, wherein the counter voltage generation circuit is responsive to receipt of the counter voltage select signal for applying the first counter voltage to the first counter electrode when the illumination device turns on and for applying the second counter voltage to the second counter electrode when the illumination device turns off.

(13) In (12), the liquid crystal display device further includes a group of terminals provided at a peripheral part of the first liquid crystal display panel for inputting a display-use signal and a voltage from an external signal source to the scan signal line drive circuit and the image signal line drive circuit, and a flexible printed circuit board having one end connected to the terminal group and the other end connected to the external signal source, wherein the power supply circuit is mounted on the flexible printed circuit board.

An effect in each of the above-noted arrangements will be explained. As recited in paragraph (1) above, a principal concept of the present invention lies in the fact that the liquid crystal display device is equipped with a counter voltage generation circuit which applies to the counter electrode opposing a pixel electrode an optimal voltage for a respective display mode of either the transmission mode and the reflection mode. As previously stated, the voltage used to create an electric field between the pixel electrode and the counter electrode is different in value between the transmission mode and the reflection mode.

In particular, in a partial-transmissive/reflective liquid crystal display device of the type having both a transmission mode displaying function and a reflection mode display function with a transmission mode display area and a reflection mode display area formed in a single pixel area, the pixel electrode as provided on or above its liquid crystal display panel is constituted from an optically transmissive portion made for example of indium-tin-oxide (ITO) and a reflective portion made of aluminum (Al) or molybdenum (Mo) or chromium (Cr) or any alloys thereof. Due to this, electrodes are different from each other in work function with respect to the liquid crystal layer. In addition, the transmissive portion and the reflective portion are different from each other in distance relative to the counter electrode.

Accordingly, the electric field being applied between the transmissive portion and the counter electrode is different from the electric field as applied between the reflective portion and the counter electrode, resulting in creation of a difference between the electric fields to be formed in the liquid crystal layer in respective display modes. As a result, even when a counter electrode voltage is an optimal voltage in the transmission mode, it hardly becomes an optimal voltage for use in the reflection mode.

In the liquid crystal display device as recited in the paragraphs (1) to (8), which is arranged to perform image displaying in both the transmission mode and the reflection mode while using the same liquid crystal display panel, it is possible to obtain an image display of high quality in either display mode by switching the counter electrode voltage being applied to the counter electrode between the transmission mode and the reflection mode, to thereby establish the optimal counter electrode voltage in a respective display mode.

Additionally, in the liquid crystal display device as recited in the paragraph (9) and those that follow, optimal counter electrode voltages are applied respectively to counter electrodes which are provided on respective liquid crystal display panels used for transmission mode display and reflection mode display. The image signal lines are commonly used or "shared" by both liquid crystal display panels and driven by image signal line drive circuitry. The scan signal lines are formed into independent groups on a per-panel basis. The scan signal lines are driven by common-use scan signal drive circuitry.

The first liquid crystal display panel and second liquid crystal display panel described above may be formed together on a single panel in such a manner that each is within a divided area of its own. Alternatively, each may be formed on a separate panel to thereby provide separate liquid crystal display panels from the point of view of their appearances. In the one with the transmission mode display area and the reflection mode display area provided on a single panel, display screens are on the same plane. On the other hand, in the one with the transmission mode display area and reflection mode display area on separate panels, it becomes possible to dispose them on different faces of the application equipment.

The counter electrode voltage switching (selection) may be designed to be operatively responsive to turn-on and turn-off of the backlight. With this scheme, during turn-on of the backlight, a first counter voltage is selected to permit visual displaying of images in the transmission mode; while, during turn-off of the backlight, a second counter voltage is selected to establish image display in the reflection mode. A control signal used to switch between the counter electrode voltages may be output from a main-body computer in accordance with the backlight's turn-on and -off operations. Alternatively, specially provided switching means may be used to enable manual switching therebetween.

With the above arrangements, it is possible to improve the display image quality in each display mode of the partial-transmissive/reflective liquid crystal display device with provision of both the transmission mode displaying function and the reflection mode display function. This in turn makes it possible to obtain on-screen display images of high quality in either display mode.

DESCRIPTION OF THE PREFERRED EMBODIMENTS

Practically implemented embodiments of the present invention will be explained in detail with reference to the accompanying drawings. Note that in the drawings to be referred to in the following explanation, those elements having the same functions are designated by the same reference characters, and a repetitive explanation thereof will be omitted maximally as possible.

Figure 1:
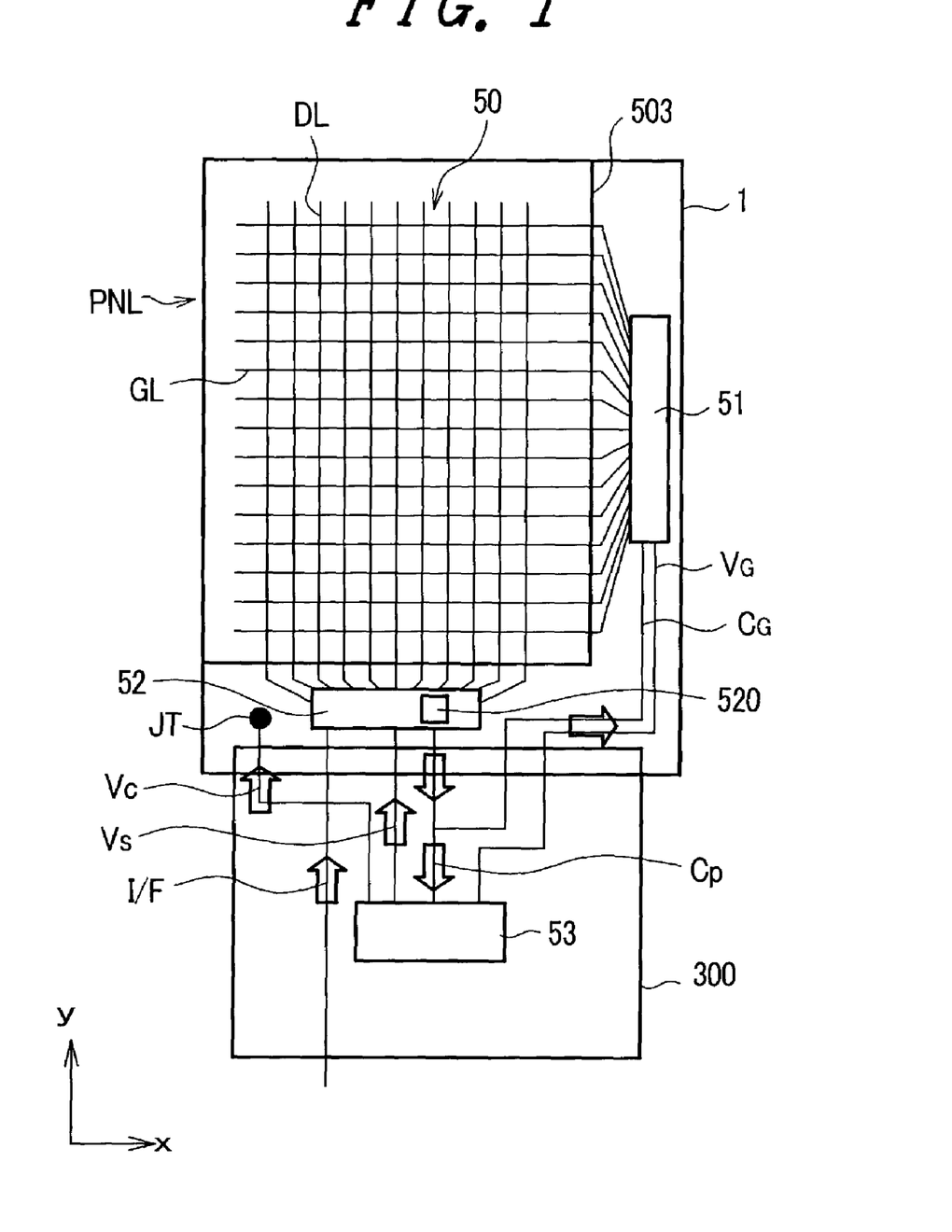
FIG. 1 is a diagram schematically showing a plan view of a first embodiment of the liquid crystal display device in accordance with the present invention.

FIG. 1 illustrates a schematic plan view of a first embodiment of the liquid crystal display device in accordance with this invention. Reference character PNL as used in this drawing indicates a liquid crystal display panel, wherein a liquid crystal layer is interposed between a first substrate 1 and a second substrate 503. This panel has on a main surface of the first substrate 1—that is, on the inner face opposing the second substrate—a plurality of scan signal lines (referred to as gate lines hereinafter) GL which extend in a first direction (horizontal direction as will be referred hereinafter as "x" direction) and are provided in parallel with a second direction (vertical direction to be referred to hereafter as "y" direction). The panel also has a plurality of image/video signal lines (referred to as drain lines hereafter) DL which extend in the y direction and are parallel-provided in the x direction, while being disposed to cross or intersect the gate lines GL.

Figure 2:
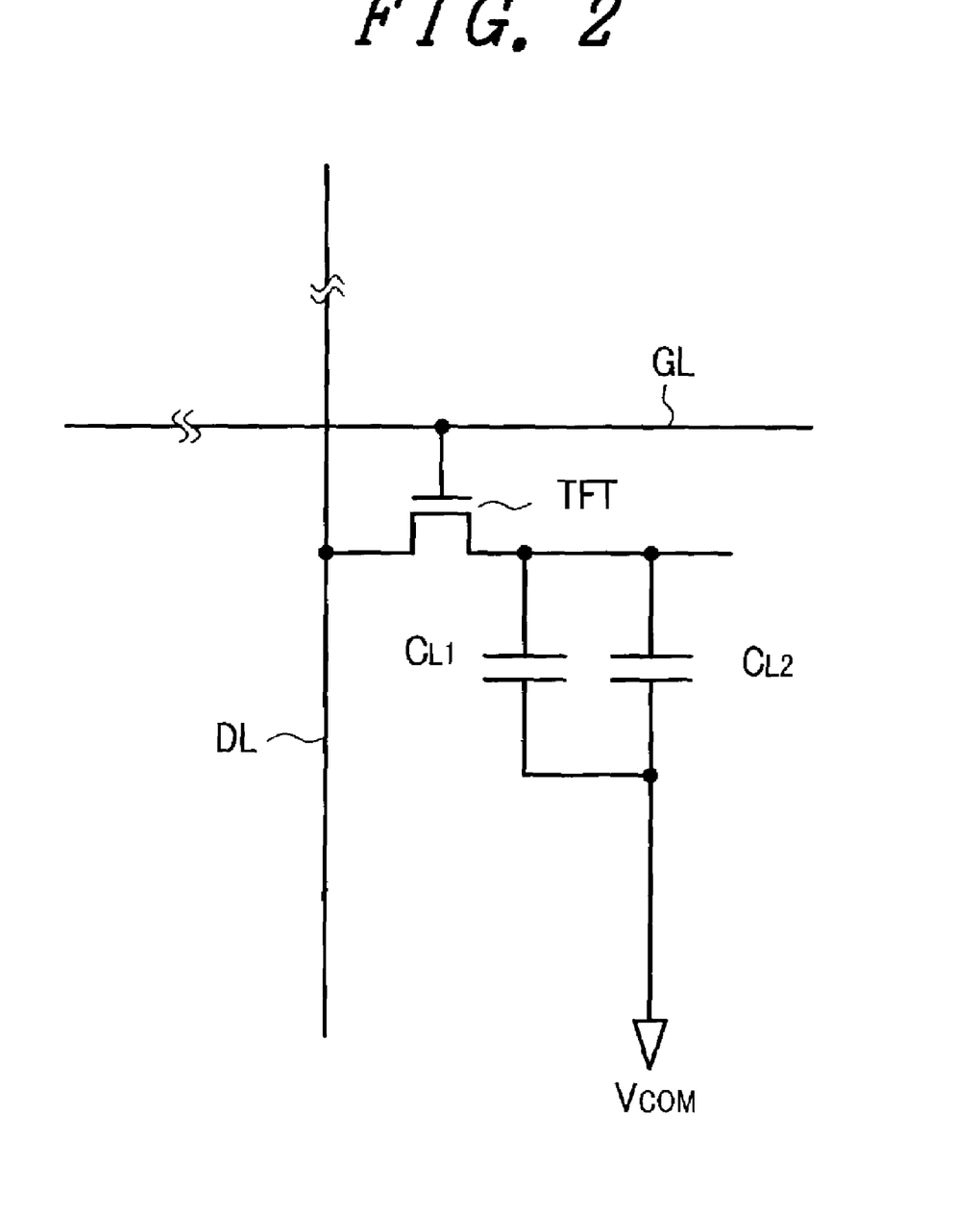
FIG. 2 is a circuit diagram of a single pixel in the liquid crystal display device of FIG. 1.

Active elements are disposed at crossing points of the gate lines GL and the drain lines DL. These active elements may preferably be thin-film transistors TFT which control turn-on and turn-off of pixels. FIG. 2 is a circuit diagram of a single pixel in the liquid crystal display device of FIG. 1, wherein a thin-film transistor TFT is connected at a cross point of a gate line GL and a drain line DL. Selection of this thin-film transistor TFT causes liquid crystal layers $C_{L1}$, $C_{L2}$ to be driven. Reference character $V_{com}$ denotes a counter electrode voltage. The liquid crystal layer $C_{L1}$ is pictorially represented as a liquid crystal layer that contributes to image display in a transmission mode; while, the liquid crystal layer $C_{L2}$ is as a liquid crystal layer that contributes to display in a reflection mode. This pixel arrangement is the same in the other embodiments, as will be described later.

A display area 50 is arranged as a region in the form of a two-dimensional matrix array in which thin-film transistors TFT are connected to the cross points of the plurality of gate lines GL and the plurality of drain lines DL. A scan signal line driving circuit (referred to as gate driver hereinafter) 51, which drives the gate lines GL, is mounted on the first substrate 1 along its one side (right side edge of FIG. 1). An image signal line driving circuit (referred to as drain driver hereafter) 52, which drives the drain lines DL, is mounted on the first substrate 1 along another side (lower side edge of FIG. 1). The drain driver 52 is equipped with a counter voltage selector circuit 520, which distinguishes between turn-on and turn-off of an illumination device and then applies a counter voltage select signal to a counter voltage generating circuit, as provided in a power supply circuit 53 to be described later.

The counter voltage generation circuit is operatively responsive to receipt of the counter voltage select signal for applying a first counter voltage to a counter electrode, when the illumination device turns on, and, when it turns off, for applying a second counter voltage to the counter electrode. Note that reference character JT indicates a terminal for power supply to the counter electrode. This embodiment is a liquid crystal display panel of the so-called twisted nematic (TN) type having the counter electrode formed on a main surface of the second substrate 503. And, a back-light unit is disposed on the back face of this liquid crystal display panel PNL.

Electrode terminals (not shown) are formed at the end of the above-noted one side of the first substrate 1. A flexible printed circuit board 300 is provided which has its one end connected to the electrode terminals and the other end connected to an external signal source (not shown). Mounted on this flexible printed circuit board 300 is a power supply circuit 53, which supplies a voltage(s) required for producing a display to the liquid crystal display panel PNL. Additionally, the power supply circuit 53 has a counter voltage generation circuit. Display data is supplied from an interface substrate (not shown) as an interface signal I/F, and then it is converted by the drain driver 52 into a gradation or color-tone signal adapted to image displaying, which will then be supplied to a drain line(s) DL.

A source voltage $V_s$ for use as a drain driver power supply voltage is supplied from the power supply circuit 53 to the drain driver 52. A gate driver power supply voltage $V_G$ and a gate control signal $C_G$ are supplied therefrom to the gate driver 51. A power supply circuit control signal $C_P$ is supplied from the drain driver 52 to the power supply circuit 53. Based on this power supply circuit control signal $C_P$, a voltage and a control signal being supplied to the drain driver 52 are generated.

Figure 3:
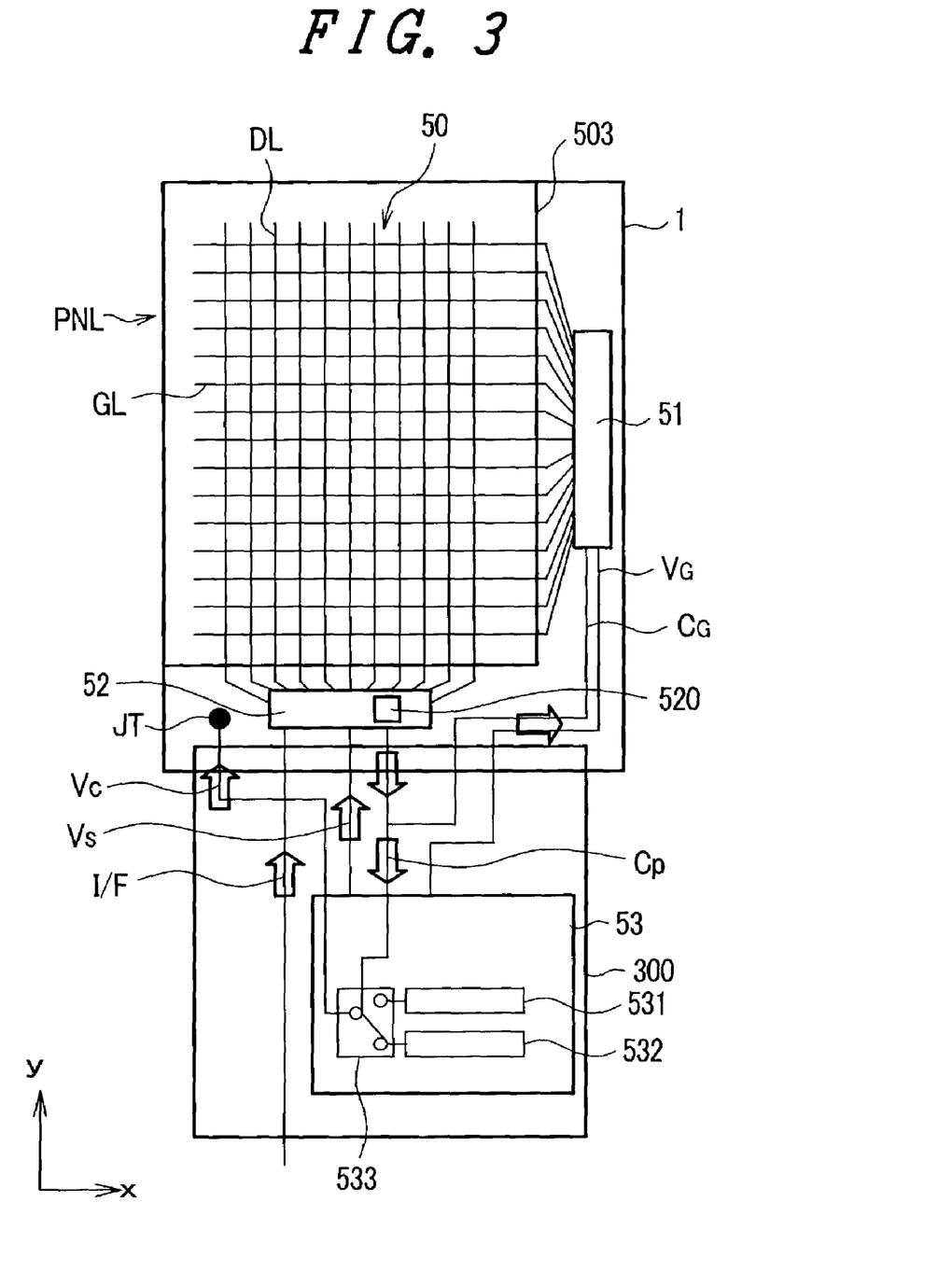
FIG. 3 is a plan view diagram showing in greater detail the configuration of the first embodiment of the liquid crystal display device in accordance with this invention.

FIG. 3 is a diagram showing a plan view of the first embodiment of the liquid crystal display device in accordance with the invention, for more detailed explanation of its arrangement. As seen in FIG. 3, the power supply circuit 53 of FIG. 1 has a first counter voltage ($V_{com}1$) generation circuit 531, a second counter voltage ($V_{com}2$) generation circuit 532, and a counter voltage selector circuit 533. This selector circuit operates in response to a power supply circuit control signal $C_p$ that is output from the counter voltage selector circuit 520 included in the drain driver 52, to thereby select one of the outputs ($V_{com}1$), ($V_{com}2$) of the first counter voltage generation circuit 531 and second counter voltage generation circuit 532. Any one of the first counter voltage ($V_{COM}1$) and the second counter voltage ($V_{com}2$) which is selected by this counter voltage selector circuit 533 is supplied to the power supply terminal JT as the counter electrode voltage $V_C$. The counter voltage generation circuit as described has the first counter voltage generation circuit 531, second counter voltage generation circuit 532 and counter voltage selector circuit 533. The other arrangements are the same as those in FIG. 1.

With such an arrangement, the power supply circuit 53 operates in response to the counter voltage select signal output from the drain driver 52 based on turn-on and turn-off operations of the backlight so as to apply to the counter electrode either the first counter voltage optimized for the transmission mode when the backlight turns on or the second counter voltage optimized for the reflection mode when the backlight turns off. Thus, it is possible to obtain high-quality on-screen display images that are free from flicker or the like in a respective display mode.

Figure 4:
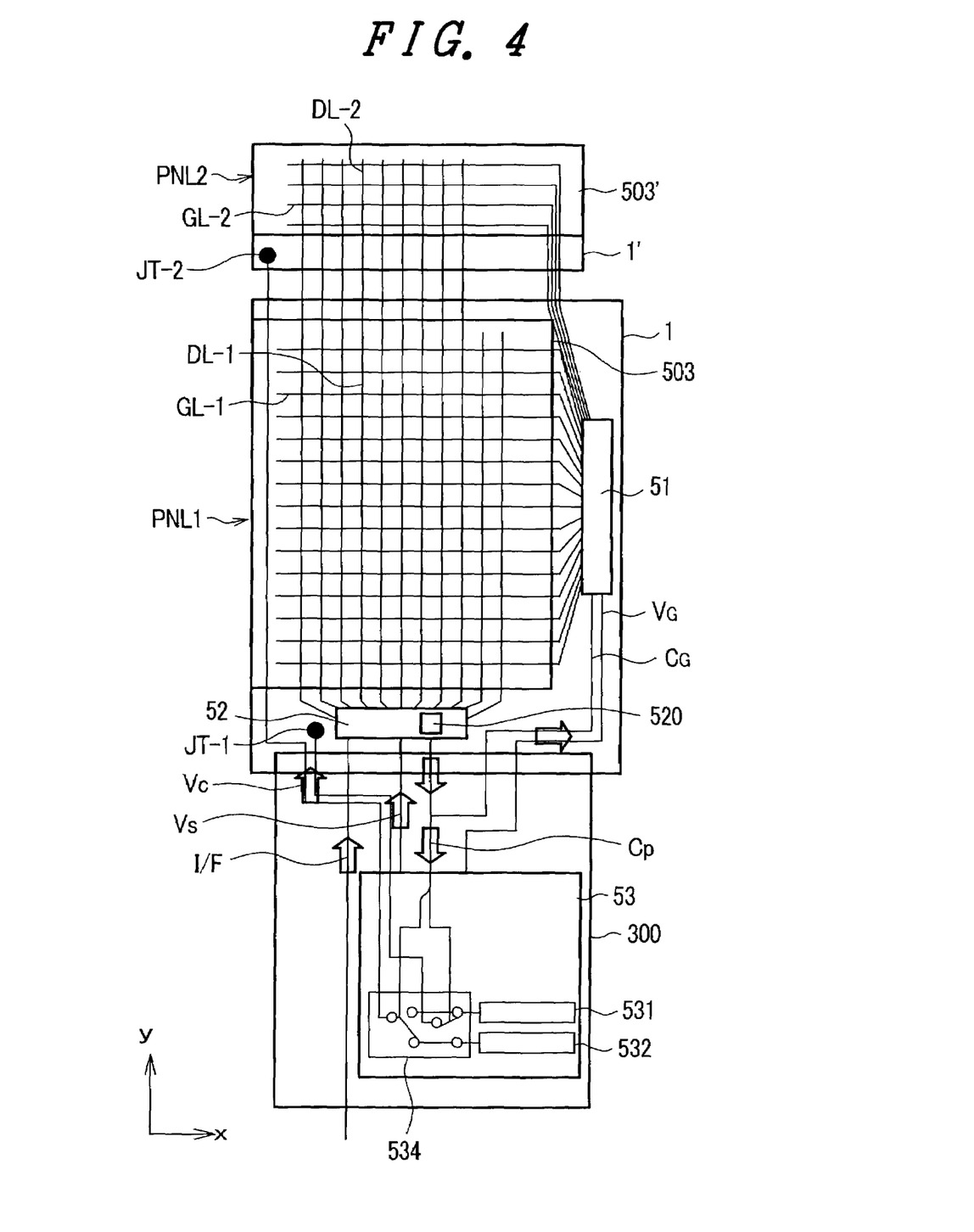
FIG. 4 is a diagram schematically showing a plan view of a second embodiment of the liquid crystal display device in accordance with the invention.

FIG. 4 depicts a schematic plan view of a second embodiment of the liquid crystal display device in accordance with the invention, for explanation of its arrangement. This embodiment is made up of a liquid crystal display panel PNL1 that is used to display images in the transmission mode, and a liquid crystal display panel PNL2 that is used for displaying in the reflection mode. More specifically, the first liquid crystal display panel PNL1 has a first liquid crystal layer which is interposed between the main surface of a first substrate 1 and the main surface of a second substrate 503, and it also has a number of gate lines GL-1 which extend in the x direction of the main surface of first substrate 1 and are provided in parallel to the y direction, as well as a number of drain lines DL-1 extending in the y direction and being parallel-provided in the x direction, while intersecting the gate lines GL-1.

The second liquid crystal display panel PNL2 has a second liquid crystal layer which is sandwiched between the main surface of a first substrate 1' and the main surface of a second substrate 503', and it also has a number of gate lines GL-2 which extend in the x direction of the main surface of first substrate 1' and are provided in parallel to the y direction; as well as a number of drain lines DL-2 extending in the y direction and being parallel-provided in the x direction, while crossing the gate lines GL-2. A power supply circuit 53 is provided, for applying to a counter electrode, that is provided on the first liquid crystal display panel PNL1, either a first counter voltage ($V_{com}1$) optimized for the transmission mode or a second counter voltage ($V_{COM}2$) optimized for the reflection mode, as a counter electrode voltage $V_C$ that is supplied to a power supply terminal JT-1. The remaining arrangements are the same as those of FIG. 3.

The power supply circuit 53 that is used in this embodiment is equipped with a counter voltage selector circuit 534 for selectively applying a counter electrode voltage to the power supply terminal JT-1 of the counter electrode, as provided at the first liquid crystal display panel PNL1, and a power supply terminal JT-2 of the counter electrode, as provided at the second liquid crystal display panel PNL2. The counter voltage selector circuit 534 is operable in response to a power supply circuit control signal $C_P$ which is output from the counter voltage selector circuit 520 of the drain driver 52 to select one of the outputs ($V_{COM}1$), ($V_{COM}2$) of the first counter voltage generation circuit 531 and second counter voltage generation circuit 532, and then apply a selected one to either the power supply terminal JT-1 or the power supply terminal JT-2.

The liquid crystal display device with such an arrangement is capable of using the first liquid crystal display panel PNL1 as a main display panel, while the second liquid crystal display panel PNL2 is used as a supplementary or auxiliary display panel, to thereby mount them in electronic equipment. As an example, the first liquid crystal display panel PNL1 is employable as a communication information display screen of a mobile wireless telephone handset, whereas the second liquid crystal display panel PNL2 is usable as a display panel providing a lesser amount of information, such as an incoming-call display window or the like.

With the arrangement of this embodiment, in addition to the effects and advantages obtainable by the arrangement of the previous embodiment, it is possible for the power supply circuit 53 to establish a display in the transmission mode, while the backlight turns on during communication operations using the first liquid crystal display panel PNL1, and alternatively to establish a display in the reflection mode when the backlight turns off during non-communication operations, such as call-waiting events or the like, thereby enabling achievement of selective use of respective features.

Optionally, it is also possible to form the first liquid crystal display panel PNL1 and the second liquid crystal display panel PNL2, as described with reference to FIG. 4, on the same substrate, to thereby permit usage in an independent form for performing "two-in-one" display operations on the same plane with a portion of the main display area serving as a sub-display area.

Although the selection between the transmission mode and reflection mode in each of the above-noted embodiments is carried out such that the counter voltage selector circuit 520 provided in the drain driver 52 automatically judges based on the backlight turn-on/off signal, as stated above, it may also be arranged so that a changeover switch or an operation unit of a variable resistor is provided in the application equipment, thereby enabling manual switching or free adjustment of the counter electrode voltage value(s) on a case-by-case basis.

Next, an explanation will be given of one example of the pixel configuration of a display panel which makes up a partial-transmissive/reflective liquid crystal display device, which is the liquid crystal display device of the invention.

Figure 5:
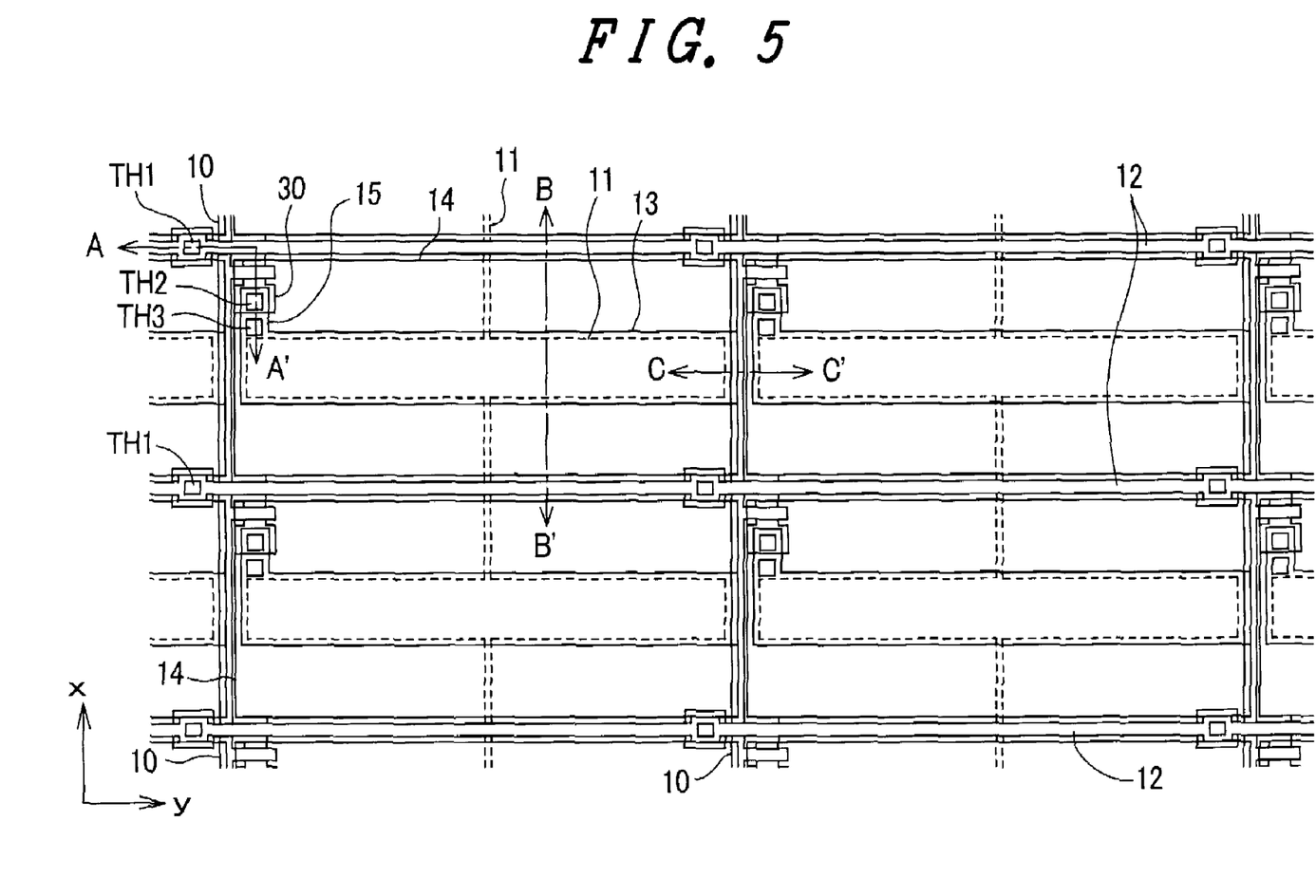
FIG. 5 is a plan view diagram showing one example of the pixel configuration of a partial-transmissive/reflective liquid crystal display device.
Figure 6A:
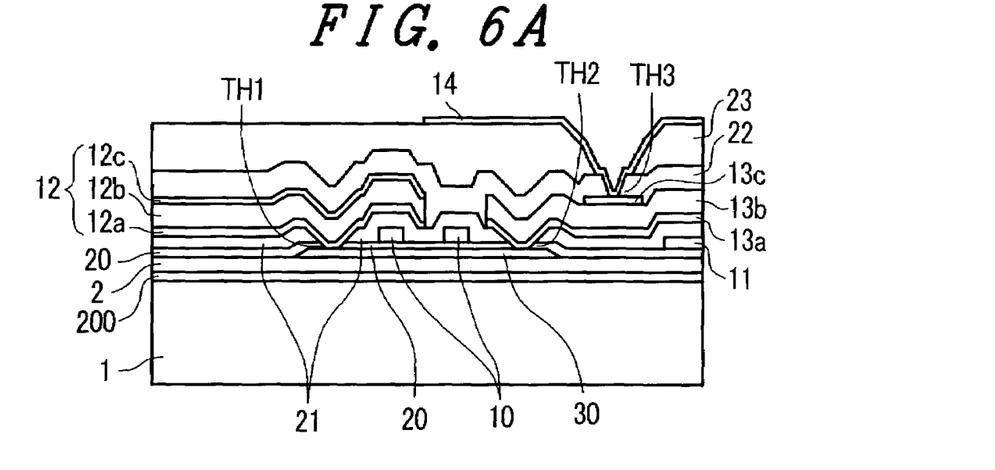
FIGS. 6A to 6C are cross-sectional diagrams of a main part of the device shown in FIG. 5.
Figure 6B:
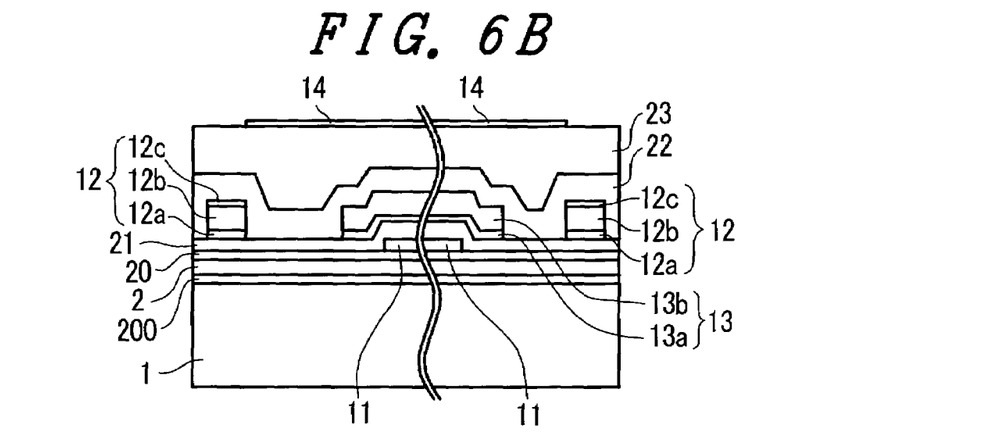
Figure 6C:
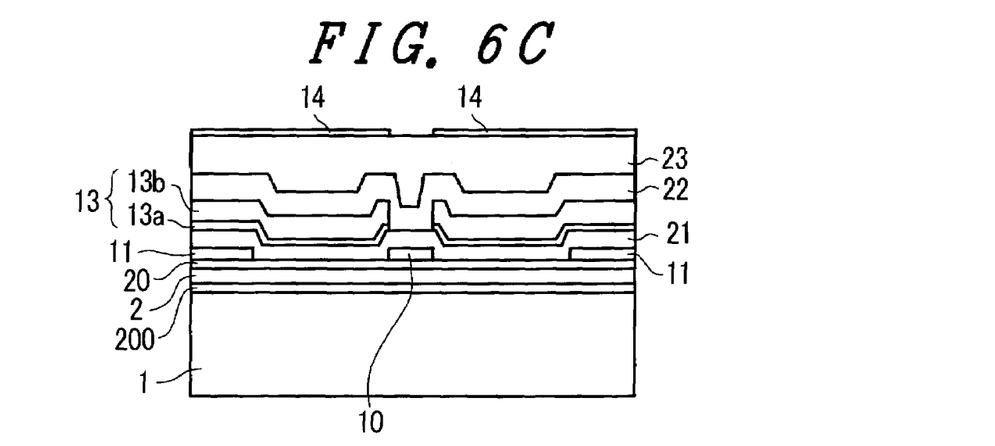

FIG. 5 is a plan view diagram of one example of the pixel configuration of the partial-transmissive/reflective liquid crystal display device, and FIGS. 6A to 6C are diagrams each showing a cross-sectional view of main part of FIG. 6. Note here that FIG. 5 shows a planar configuration of four adjacent pixels. FIGS. 6A-6C show cross-sections as taken along lines A-A', B-B' and C-C' of FIG. 5, respectively. Also note that FIG. 5 and FIGS. 6A-6C show only one substrate side on which active elements (for example, thin-film transistors) are formed for performing pixel selection, wherein any illustration of the other substrate with more than one color filter and counter electrode provided thereon is omitted.

In FIG. 5 and FIGS. 6A-6C, a pixel structure body is formed on or above a buffer film which overlies a nonalkali glass substrate 1, and it is comprised of a $Si_3N_4$ film 200 having a thickness of 50 nanometers (nm) and a $SiO_2$ film 2 with a thickness of 120 nm. Formed on this buffer film is a polycrystalline silicon (poly-Si) film 30 with a thickness of 50 nm, which constitutes thin-film transistors TFT. Gate lines 10 (corresponding to GL in FIGS. 1-4) made of Mo with a thickness of 200 nm are formed over the poly-Si film 30, with a 100-nm thick $SiO_2$ gate dielectric film 20 sandwiched therebetween.

And, a common electrode 11 for charge accumulation is formed by using the same Mo as the gate lines 10. This common electrode 11 is indicated by dotted contour lines in FIG. 5. An interlayer dielectric film 21 made of $SiO_2$ with a thickness of 10 nm is formed to overlie and cover the common electrode 11. Drain lines 12 (corresponding to DL in FIGS. 1-4) comprised of a three-layer metallic film of a Mo layer 12*a* and an Al layer 12*b*, plus a Mo layer 12*c* and a reflective electrode 13, which also acts as source electrodes of the thin-film transistors, are connected by way of contact through-holes TH1, TH2 that are provided in the interlayer dielectric film 21.

Of the three-layer metal film of the Mo layer 13*a* and Al layer 13*b*, plus the Mo layer 13*c*, making up this reflective electrode 13, the Mo layer 13*a* that underlies the Al layer 13*b* is provided for reduction of the contact resistance between the Si film 30 and Al layer 13*b*. Similarly, the Mo layer 13*c* is provided to reduce the resistance between it and pixel electrodes 14. In FIG. 6A, two gate electrodes 10 are formed above the Si film 30. One of these two gate electrodes 10 is the so-called main line which extends along a plurality of pixel regions provided in parallel. The other of them is a branch line which is projected or protruded from this main line toward one certain pixel region (see FIG. 5).

Of the reflective electrode 13 portion which serves also for use as a source electrode 15, the Mo film 13*c* at an upper layer level is left only at a contact portion with an ITO film making up the pixel electrode 14 and its peripheral portions, and the Mo film of the upper layer is removed away at the remaining portions. The main surface of a thin-film transistor substrate is covered or coated with both a protective dielectric film 22 made of $Si_3N_4$ with a thickness of 200 nm and an organic protective film 23 mainly comprised of acrylic resin material with a thickness of 2 micrometers (μm). A pixel electrode 14 made of ITO is connected to the source electrode 15 (reflective electrode 13) of a thin-film transistor via a contact through-hole TH3, which is provided in the protective dielectric film 22 and the organic dielectric film 23. A charge accumulation capacitive element is formed by the reflective electrode 13 and the common electrode 11 of the charge accumulation capacitance, having the interlayer dielectric film 21 sandwiched therebetween.

Since the pixel electrode 14 is provided on the upper side (i.e. liquid crystal side not shown) of the reflective electrode 13, it is possible for the reflective electrode 13 to offer the functionality for control of the orientation or alignment directions of liquid crystal molecules in the liquid crystal layer even in the so-called reflective display area. With such an arrangement, it is possible to provide the intended partial-transmissive/reflective liquid crystal display device with increased aperture ratios and enhanced brightness or luminosity.

Figure 7:
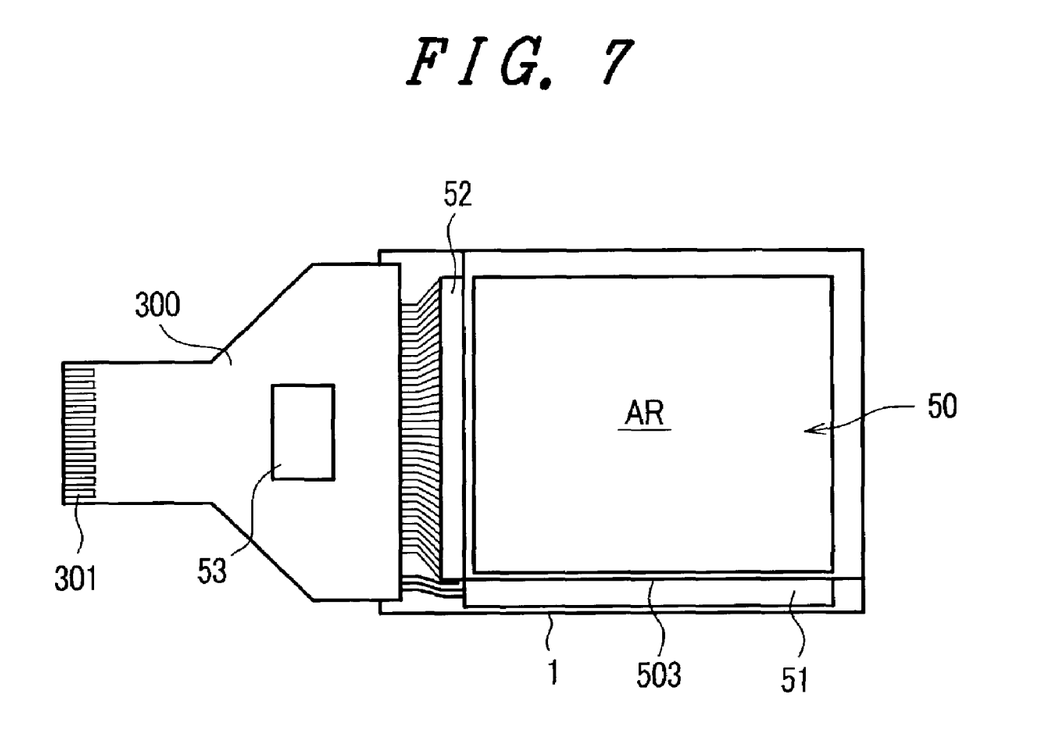
FIG. 7 is a plan view diagram showing an example of the outer appearance of the liquid crystal display device in accordance with the invention.

FIG. 7 is a plan view showing an example of the outer appearance of the liquid crystal display device in accordance with the invention. The first substrate 1 and second substrate 503 make up a liquid crystal display panel having an active-matrix array (display area) 50, with a scan signal line drive circuit 51 and image signal line drive circuit 52 mounted at peripheral portions thereof. These circuits are formed of integrated circuit chips. A power supply circuit 53 is mounted on a flexible printed circuit board 300.

Figure 8:
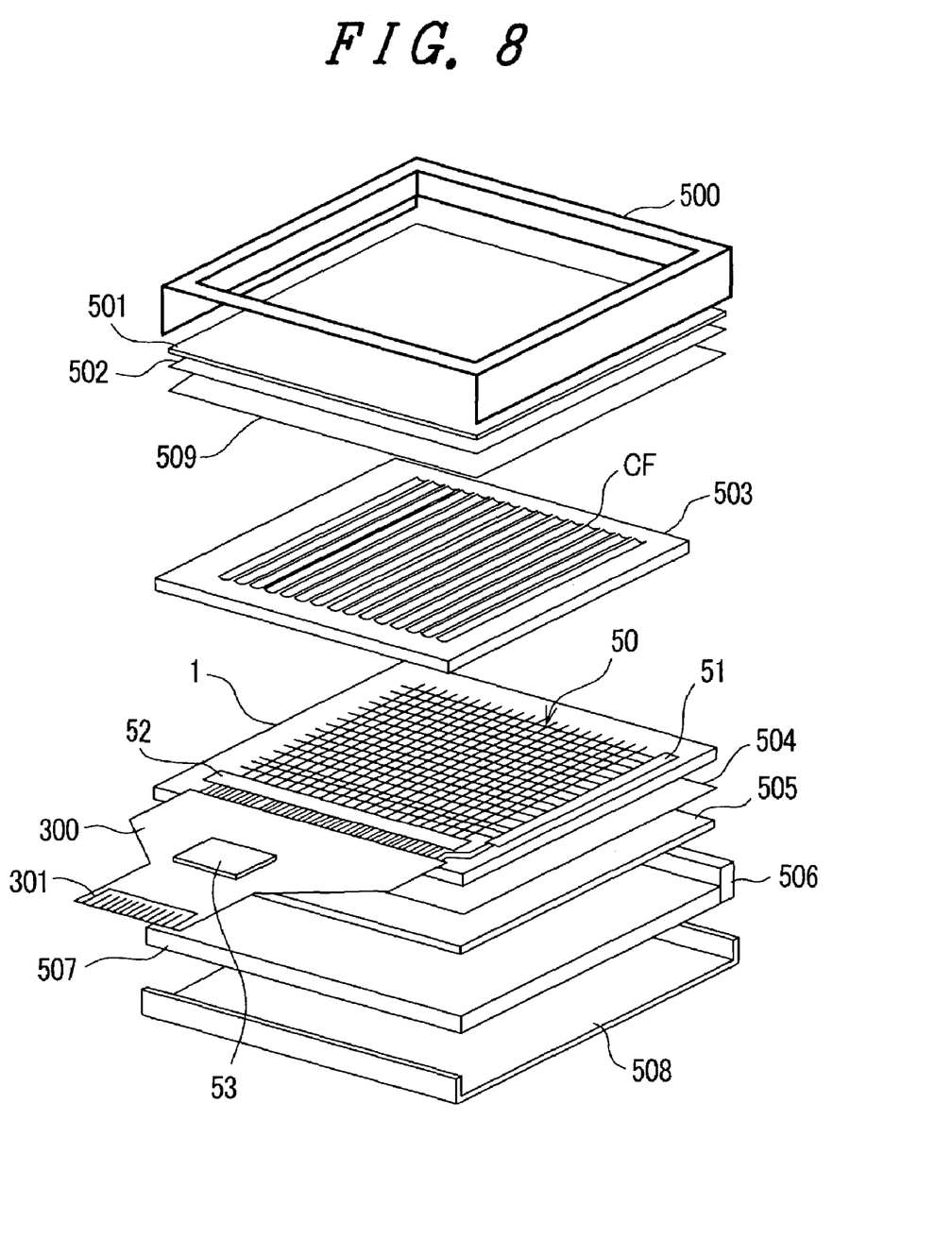
FIG. 8 depicts an exploded perspective view of a liquid crystal display module using the liquid crystal display device in accordance with the invention, as shown in FIG. 7.

FIG. 8 is an exploded perspective view of the liquid crystal display module using the liquid crystal display device in accordance with the invention as shown in FIG. 7. This LCD module has on the first substrate 1 an active-matrix array (display area) 50 along with a scan signal line drive circuit 51 and image signal line drive circuit 52, with a color filter CF and counter electrode (not shown) formed on or above the main surface (inner surface) of a second substrate 503. A liquid crystal layer is sealed between the first substrate 1 and the second substrate 503. Further, a phase difference film 504 and an optical polarization film 505 are provided on or above the back face of the first substrate 1. Similarly, a phase difference film 509 and a polarization film 501 are provided on or above the back surface of the second substrate 503 also.

The scan signal line drive circuit 51 and the image signal line drive circuit 52 are mounted at the periphery of the first substrate 1. One end of the flexible printed circuit board 300, on which the power supply circuit 53 that is made up of more than one integrated circuit chip is mounted, is connected to a mount side edge of the image signal line drive circuit 52. Terminals 301 at the other end are connected to an external signal source (not shown). An illumination device (backlight), which is constituted from a light-emitting diode 506 and a light guide plate 507, is disposed on the back face of the liquid crystal display panel. These constituent components are made integral by a lower case 508 and an upper case 500, to thereby complete the liquid crystal display module. This liquid crystal display module is designed for use as the display means in cellular telephone handsets and/or mobile information terminals, such as palmtop computers and personal digital assistant (FDA) tools.

As apparent from the foregoing description, according to the present invention, it is possible to improve the display quality in each display mode in a partial-transmissive/reflective liquid crystal display device having both a transmission mode displaying function and a reflection mode display function, thereby enabling achievement of a liquid crystal display device that is capable of performing high-quality image/video displaying operations in either display mode.

What is claimed is:

1. A liquid crystal display device comprising:
a first liquid crystal display panel for displaying an image in a transmission mode, said first liquid crystal display panel having a number of first pixel electrodes, a first counter electrode for applying an electric field between itself and said first pixel electrodes, and a first liquid crystal layer interposed between said first pixel electrodes and said first counter electrode;
a second liquid crystal display panel for displaying an image in a reflection mode, said second liquid crystal display panel having a number of second pixel electrodes, a second counter electrode for applying an electric field between itself and said second pixel electrodes, and a second liquid crystal layer interposed between said second pixel electrodes and said second counter electrode;
a first counter voltage generation circuit for applying a first counter voltage optimized for display of the transmission mode to said first counter electrode of said first liquid crystal display panel; and
a second counter voltage generation circuit for applying a second counter voltage optimized for display of the reflection mode to said second counter electrode of said second liquid crystal display panel.

2. The liquid crystal display device according to claim 1, wherein said first counter voltage generation circuit and said second counter voltage generation circuit apply said first counter voltage and said second counter voltage at times mutually exclusive from one another.

3. The liquid crystal display device according to claim 1, comprising:
an illumination device disposed at a back face of said first liquid crystal display panel;
wherein said first counter voltage generation circuit applies said first counter voltage to said first counter electrode when said illumination device is on; and
wherein said second counter voltage generation circuit applies said second counter voltage to said second counter electrode when said illumination device is off.

4. The liquid crystal display device according to claim 3, wherein said first counter voltage generation circuit and said second counter voltage generation circuit apply said first counter voltage and said second counter voltage at times mutually exclusive from one another.

5. The liquid crystal display device according to claim 1, comprising:
an illumination device disposed at a back face of said first liquid crystal display panel;
wherein said first counter voltage generation circuit automatically applies said first counter voltage to said first counter electrode when said illumination device is on; and
wherein said second counter voltage generation circuit automatically applies said second counter voltage to said second counter electrode when said illumination device is off.

6. The liquid crystal display device according to claim 5, wherein said first counter voltage generation circuit and said second counter voltage generation circuit apply said first counter voltage and said second counter voltage at times mutually exclusive from one another.

7. A liquid crystal display device comprising:
a first liquid crystal display panel having a first liquid crystal layer interposed between a main surface of a first substrate and a main surface of a second substrate, a number of first scan signal lines extending in a first direction of the main surface of said first substrate and being provided in parallel with a second direction thereof, a number of first image signal lines extending in said second direction and being provided in parallel to said first direction while being disposed to intersect said first scan signal lines, a first active element disposed at a crossing portion of said first scan signal lines and said first image signal lines for controlling turn-on and turn-off of a pixel, a first pixel electrode driven by said first active element for performing displaying in a transmission mode, and a first counter electrode formed at the main surface of said first substrate or said second substrate for generating an electric field between itself and said first pixel electrode;

a second liquid crystal display panel having a second liquid crystal layer interposed between a main surface of a third substrate and a main surface of a fourth substrate, a number of second scan signal lines extending in the first direction of the main surface of said third substrate and being provided in parallel with the second direction thereof, a number of second image signal lines extending in said second direction and being provided in parallel to said first direction while being disposed to intersect said second scan signal lines, a second active element disposed at a crossing portion of said second scan signal lines and said second image signal lines for controlling turn-on and turn-off of a pixel, a second pixel electrode driven by said second active element for performing displaying in a reflection mode, and a second counter electrode formed at the main surface of said third substrate or said fourth substrate for generating an electric field between itself and said second pixel electrode;

a scan signal line drive circuit for applying scan signals to said first scan signal lines provided at said first liquid crystal display panel and said second scan signal lines provided at said second liquid crystal display panel;

an image signal drive circuit for applying first image signals to said first image signal lines provided at said first liquid crystal display panel and for applying second image signals to said second image signal lines provided at said second liquid crystal display panel; and a power supply circuit for supplying necessary voltages to said scan signal line drive circuit and said image signal line drive circuit and for supplying a first counter voltage optimized for the transmission mode to said first counter electrode of said first liquid crystal display panel and also a second counter voltage optimized for the reflection mode to said second counter electrode of said second liquid crystal display panel.

8. The liquid crystal display device according to claim 7, wherein
said power supply circuit comprises a counter voltage generation circuit for generation of the first counter voltage and the second counter voltage which are made optimal to respective display modes of said transmission mode and said reflection mode.

9. The liquid crystal display device according to claim 8, comprising:
an illumination device disposed on a back face of said first liquid crystal display panel; and
a counter voltage selector circuit provided in said image signal line drive circuit for distinguishing between turn-on and turn-off of said illumination device and for giving a counter voltage select signal to said counter voltage generation circuit, wherein
said counter voltage generation circuit is responsive to receipt of said counter voltage select signal for applying said first counter voltage to said first counter electrode when said illumination device turns on and for applying said second counter voltage to said second counter electrode when said illumination device turns off.

10. The liquid crystal display device according to claim 9, comprising:
a group of terminals provided at peripheral part of said first liquid crystal display panel for inputting a display-use signal and a voltage from an external signal source to said scan signal line drive circuit and said image signal line drive circuit; and
a flexible printed circuit board having one end connected to the terminal group and a remaining end connected to said external signal source, wherein
said power supply circuit is mounted on said flexible printed circuit board.

11. The liquid crystal display device according to claim 7, wherein said power supply circuit applies said first counter voltage and said second counter voltage at times mutually exclusive from one another.

12. The liquid crystal display device according to claim 7, comprising:
an illumination device disposed at a back face of said first liquid crystal display panel;
wherein said power supply circuit applies said first counter voltage to said first counter electrode when said illumination device is on; and
wherein said power supply circuit applies said second counter voltage to said second counter electrode when said illumination device is off.

13. The liquid crystal display device according to claim 12, wherein said power supply circuit applies said first counter voltage and said second counter voltage at times mutually exclusive from one another.

14. The liquid crystal display device according to claim 7, comprising:
an illumination device disposed at a back face of said first liquid crystal display panel;
wherein said power supply circuit automatically applies said first counter voltage to said first counter electrode when said illumination device is on; and
wherein said power supply circuit automatically applies said second counter voltage to said second counter electrode when said illumination device is off.

15. The liquid crystal display device according to claim 14, wherein said power supply circuit applies said first counter voltage and said second counter voltage at times mutually exclusive from one another.

16. A liquid crystal display device comprising:
a first liquid crystal display panel for displaying an image in a transmission mode, said first liquid crystal display panel having a number of first pixel electrodes, a first counter electrode for applying an electric field between itself and said first pixel electrodes, and a first liquid crystal layer interposed between said first pixel electrodes and said first counter electrode;
a second liquid crystal display panel for displaying an image in a reflection mode, said second liquid crystal display panel having a number of second pixel electrodes, a second counter electrode for applying an electric field between itself and said second pixel electrodes, and a second liquid crystal layer interposed between said second pixel electrodes and said second counter electrode;
a first counter voltage generation circuit for applying a first counter voltage optimized for display of the transmission mode to said first counter electrode of said first liquid crystal display panel; and
a second counter voltage generation circuit for applying a second counter voltage optimized for display of the reflection mode to said second counter electrode of said second liquid crystal display panel;
wherein said first counter voltage and said second counter voltage are at voltage levels mutually different from one another.

17. The liquid crystal display device according to claim 16, wherein said first counter voltage generation circuit and said second counter voltage generation circuit apply said first counter voltage and said second counter voltage at times mutually exclusive from one another.

18. The liquid crystal display device according to claim 16, comprising:
- an illumination device disposed at a back face of said first liquid crystal display panel;
- wherein said first counter voltage generation circuit applies said first counter voltage to said first counter electrode when said illumination device is on; and
- wherein said second counter voltage generation circuit applies said second counter voltage to said second counter electrode when said illumination device is off.

19. The liquid crystal display device according to claim 18, wherein said first counter voltage generation circuit and said second counter voltage generation circuit apply said first counter voltage and said second counter voltage at times mutually exclusive from one another.

20. The liquid crystal display device according to claim 16, comprising:
- an illumination device disposed at a back face of said first liquid crystal display panel;
- wherein said first counter voltage generation circuit automatically applies said first counter voltage to said first counter electrode when said illumination device is on; and
- wherein said second counter voltage generation circuit automatically applies said second counter voltage to said second counter electrode when said illumination device is off.

21. The liquid crystal display device according to claim 20, wherein said first counter voltage generation circuit and said second counter voltage generation circuit apply said first counter voltage and said second counter voltage at times mutually exclusive from one another.

\* \* \* \* \*